No. 894,516. PATENTED JULY 28, 1908.
H. F. MAYNES.
TRANSMISSION GEARING AND BRAKE MECHANISM.
APPLICATION FILED AUG. 22, 1907.
2 SHEETS—SHEET 1.
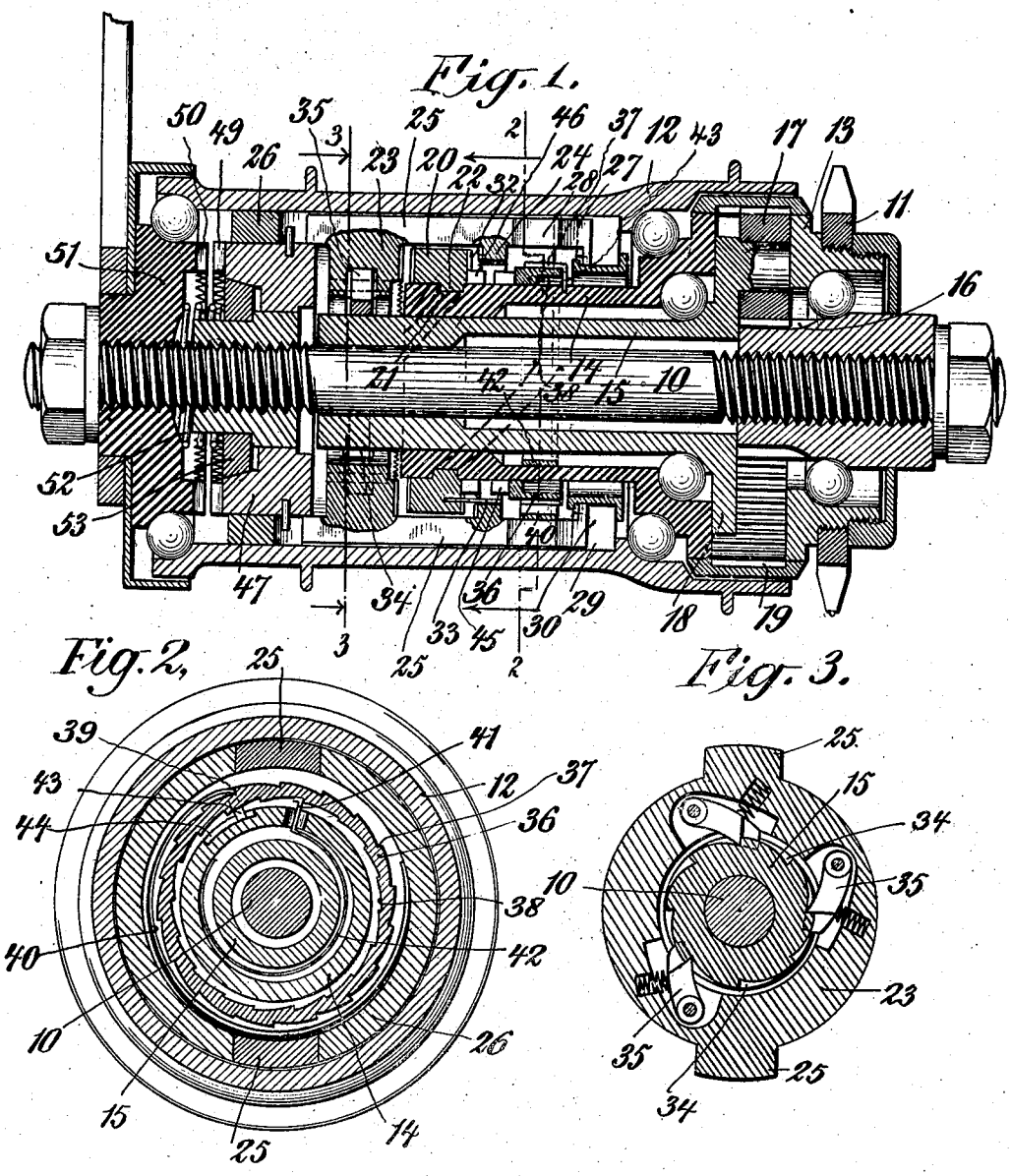
WITNESSES:
INVENTOR
BY
ATTORNEYS No. 894,516. PATENTED JULY 28, 1908.
H. F. MAYNES.
TRANSMISSION GEARING AND BRAKE MECHANISM.
APPLICATION FILED AUG. 22, 1907.
2 SHEETS—SHEET 2.
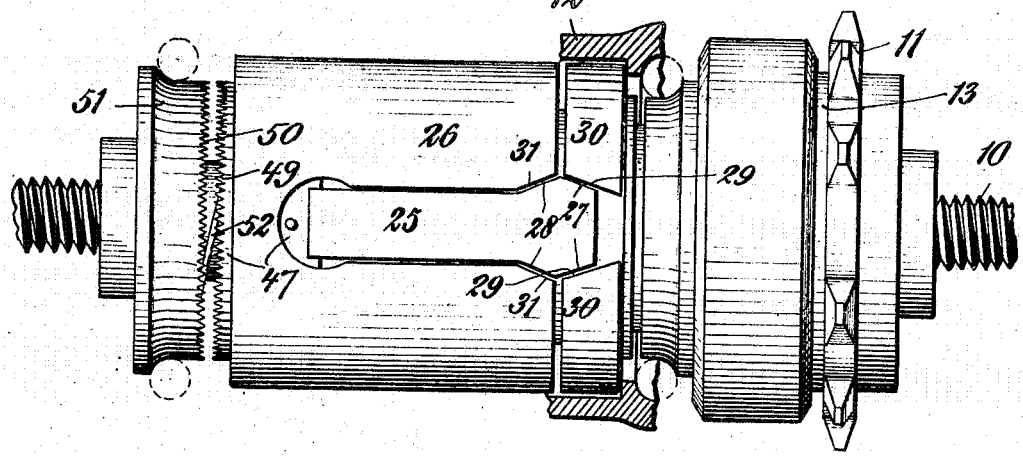
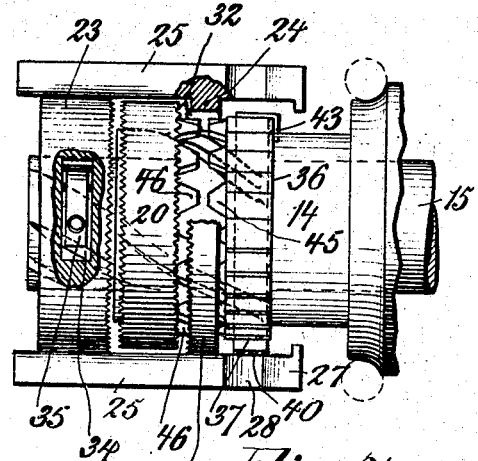
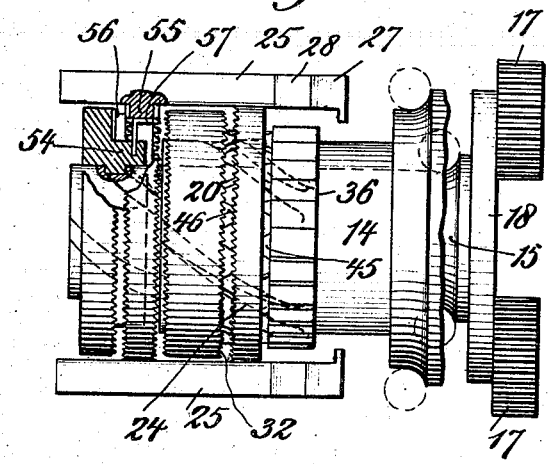
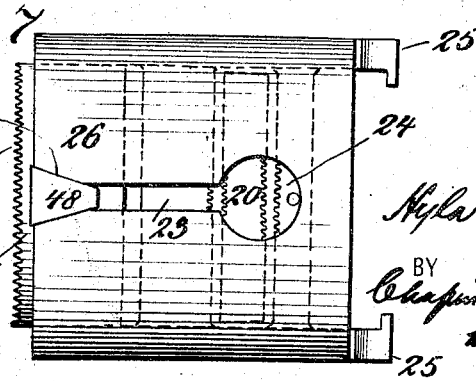
WITNESSES:
Geo. A. Klimek
Lyman S. Andrews Jr.
INVENTOR
Hyla F. Maynes
BY
Chapin Maynes
his ATTORNEYS

UNITED STATES PATENT OFFICE.

HYLA F. MAYNES, OF GAINES, PENNSYLVANIA.

TRANSMISSION-GEARING AND BRAKE MECHANISM.

No. 894,516.  Specification of Letters Patent.  Patented July 28, 1908.

Application filed August 22, 1907. Serial No. 389,680.

*To all whom it may concern:*

Be it known that I, HYLA F. MAYNES, a citizen of the United States of America, and a resident of Gaines, county of Tioga, and State of Pennsylvania, have invented certain new and useful Improvements in Transmission-Gearing and Brake Mechanism, of which the following is a specification, reference being had to the accompanying drawings, forming a part thereof.

My invention relates to improvements in transmission gearing and brake mechanism, and particularly to two speed, coaster, and brake mechanism adapted for use in connection with bicycles.

In the most approved form of two speed and coaster brake mechanism of the present day, and for which a number of United States patents have already been granted to me, the changes from one speed of drive to another is brought about by movements of the driving element itself. It is also highly desirable that brake mechanism be provided in connection therewith, such as is also operated by the driving element, as in the ordinary single speed, coaster, and brake mechanism of the present day.

The main object then of my present invention is to provide a simple, efficient and durable two speed, coaster, and brake mechanism, the entire operation of which is under control of the power transmitting or driving element.

In the present form of my invention I have adapted the well known form of "Morrow" coaster and brake mechanism to my two speed gearing, employing the operating element therein for not only applying the brake, but also for connecting either of two driving sleeves in driving relation with the driven element, and for bringing about the operation of the means by which the particular sleeve to be so connected is selected.

My invention therefore consists first in a novel two speed, coaster, and brake mechanism arranged to be entirely operated and controlled by the driving element; second in the employment of a single operating member or element, normally disconnected from direct engagement with the driving element, certain of whose movements will bring about changes in the mechanism to vary the speed of drive, other of whose movements will apply a brake, and other of whose movements will connect the driving and driven elements in driving relation at one speed or another in accordance with the speed of drive selected; and thirdly my invention consists in many novel details of construction and combination of parts as will hereinafter more fully appear.

In order that my invention may be fully understood I will now proceed to describe an embodiment thereof, having reference to the accompanying drawings illustrating the same and will then point out the novel details in claims.

In the drawings: Figure 1 is a view in central longitudinal section through a bicycle hub and mechanism in connection therewith constituting an embodiment of my invention. Fig. 2 is a view in transverse section thereof, upon the plane of the line 2—2 of Fig. 1. Fig. 3 is a detail view, in transverse section, of certain parts, the plane of section being upon the line 3—3 of Fig. 1. Fig. 4 is a view in elevation of the parts contained within the hub, and showing a small portion of the hub in section. Fig. 5 is a detail view in elevation of certain parts of the clutch operating and controlling mechanism. Fig. 6 is a similar view of a slightly modified form of the device. Fig. 7 is a detail view in elevation of certain parts, viewed at right angles to the point of view of Fig. 4, showing particularly the brake shell and certain co-acting and co-related parts.

The device, as a whole, comprises a stationary axle 10, a sprocket wheel 11 concentrically mounted thereon and constituting a power transmitting device or driving element, and a hub 12, which may conveniently be the hub of a bicycle wheel, also mounted concentrically with respect to the stationary axle and constituting the driven element. The sprocket wheel 11 is secured fast to a flange 13 formed as a part of, or rigidly secured to, a sleeve 14, which I herein describe as the "high speed sleeve" of the device. The said sleeve is mounted within the hub 12 and surrounds the axle 10. A second sleeve 15, which I herein term the "low speed sleeve" is also mounted within the hub around the said axle 10, being located between the high speed sleeve 14 and the said axle. The two sleeves are connected to rotate together at different rates of speed by means of gearing comprising a stationary sun gear 16 secured upon the axle 10, planetary gears 17 in mesh with the said sun gear 16 and mounted upon arbors carried by a flange 18 of the said low speed sleeve 15, whereby they will rotate bodily therewith, and will have a planetary movement with respect to the sun gear 16 independent of their own movement of rotation, and an internal gear ring 19 with which the planetary gears 17 also mesh, the said internal gear ring being secured to, and carried by, the high speed sleeve 14. The relationship of the foregoing gearing is such that the two sleeves are positively connected to rotate together, but the relative rate of the speed of the sleeve 14 is higher than that of the sleeve 15. It will follow now that if movement be transmitted to the element 11 and the high speed sleeve be connected by a suitable clutch mechanism to the hub 12 the said hub will be driven at the same rate of speed as the high speed sleeve and as the driving element, but that if the clutch between the high speed sleeve and the hub be released and the low speed sleeve be connected by a suitable clutch mechanism to the said hub, then when driving movements are transmitted to the element 11 the hub 12 will still be driven forward but at a lower rate of speed.

I will first describe the clutch mechanism between the high speed sleeve and the hub: This mechanism includes a clutch operating ring 20 which is mounted upon, and carried by, the high speed sleeve 14, the said sleeve being provided with a spiral thread 21 with which a corresponding projection 22 of the said ring 20 engages, the ring and sleeve forming in effect a nut and screw of somewhat high pitch. The screw is right handed, as here shown, so that when the driving element is given clock-wise driving movements (as viewed from the right hand end of Fig. 1), the said ring 20 will be given a tendency to move over toward the said right hand end, by screwing up upon the thread. The ring 20 is mounted between two rings 23 and 24, which together constitute a carrier for expanding members or wedges 25, said expanding members or wedges and the said rings constituting as a whole an operating member for various purposes as will presently be explained. The said expanding members or wedges are mounted in slots in a brake shell 26 (see Fig. 4), and have two sets of tapered faces 27 and 28, the former arranged to engage with corresponding faces 29 in a segmental clutch ring 30, and the latter with corresponding faces 31 in the brake shell 26. The operating member, including the wedges 25 and the rings 23 and 24, the brake shell 26, and the segmental clutch ring 30, are thus in constant rotative engagement with each other. When the ring or nut 20 is forced over to the right, as just explained, it will engage the carrier ring 24 and will thereby force the expanding members or wedges 25 over to the right to cause the tapered faces 27 to engage the faces 29 of the segments 30, whereby to expand the said segments 30 and to force them against the inner surface of the hub 12 to rotatively connect them therewith. The adjacent faces of the rings 20 and 24 are provided with co-acting teeth 32, so that the said rings will be rotatively connected together when in engagement as just set forth, so that when the several parts are in the position just referred to the hub 12 and the high speed sleeve 14 will be positively connected together in driving relation. I preferably provide the nut or ring 20 with the usual friction drag generally employed in this type of clutch, such friction drag comprising an expansible steel ring 33 secured to, and carried by the said ring 20 and having a frictional engagement with the inner surface of the carrier ring 24. This drag ring operates to prevent the nut or ring 20 from being carried around freely with the high speed sleeve, as might otherwise happen, giving it a tendency to hang back so that it will positively screw up on the sleeve when permitted so to do.

I will now proceed to describe the clutch mechanism for connecting the low speed sleeve 15 with the hub 12, it being understood that suitable means is provided for throwing the high speed clutch out of operation when the low speed clutch is employed. The low speed sleeve 15 is provided near its left hand end with spiral grooves 34, to which are fitted pawls 35, which are mounted in, and carried by, the carrier ring 23. The ring 23 and pawls 35 act as a nut upon the screw of the sleeve 15, whereby when the sleeve is rotated clock-wise the ring 23 is given a tendency to move toward the right, just as in the same manner as previously described for the high speed clutch ring 20. But the ring 23 being a portion of the carrier for the expanding members or wedges 25, it will follow that the movement of the ring 23 to the right will cause the expanding members to correspondingly move to the right and to force apart the clutch segments 30, whereby to engage the inner surfaces of the hub 12 in the manner above set forth. The low speed clutch ring will be thus directly connected with the hub 12 through the medium of the grooves 34, the pawls 35, the ring 23, the wedges 25, and the clutch segments 30, as just explained. It will be noted, however, that because the sleeve 14 rotates at a higher rate of speed than the sleeve 15, the low speed clutch will be over-driven when the high speed clutch is in operation so that at such time the low speed clutch will be inoperative,—the pawls will merely ride over or across the grooves 34 without operatively engaging them at all.

For the purpose of rendering the high speed clutch inoperative when it is desired to drive through the low speed clutch I have provided a clutch controller, which I will now describe, such clutch controller being operated by relative movements of the power transmitting member 11 itself. The clutch controller comprises a ring 36 mounted on, and carried by, the high speed sleeve 14, said ring provided with exterior ratchet teeth 37 and interior ratchet teeth 38. A pawl 39, here shown as a part of an expanding spring 40, is arranged to engage the exterior teeth 37, while a pawl 41 arranged as a part of a spring 42 engages the interior set of teeth 38. The expanding spring 40 bears frictionally against the interior of the shell 26 and hence has a tendency to partake of the movements thereof, while the pawl 41 passes through a slot in the high speed sleeve 14, whereby it partakes of the movements of the said sleeve. If rearward or "back pedaling" movements be given to the power transmitting member 11 and hence also to the high speed sleeve 14, while the shell 26 is held stationary, (and the said shell 26 will be held stationary at such times, as will presently appear) the effect will be to produce a relative rearward movement of the high speed sleeve with respect to the clutch controller ring 36, said clutch controller ring being held stationary with the shell 26 by means of the pawl 39. The pawl 39 has an inwardly projecting portion 43 which engages with a depression 44 in the high speed sleeve 14, said depression being of such a length as to permit a relative movement between the said sleeve and the clutch controller ring 36, a distance of just one tooth. Further rearward movements of the sleeve 14 will have the effect of merely carrying the ring 36 backwards with it, as will be well understood by reference to Fig. 2 of the drawings. The pawl 41 will act as a stop pawl when the sleeve 14 thus moves rearwardly with respect to the ring 36, said pawl picking up another tooth at such time so that when forward movements are again applied to the high speed sleeve 14 (by reason of forward driving movements again applied to the power transmitting member 11), the ring 36 will again be carried around in a forward direction with the said high speed sleeve 14, the pawl 39 and spring 40 hanging back during the first forward movement of the sleeve 14 (the shell being still held stationary), whereby the pawl 39 will be caused to pick up a new tooth ready for the next clutch controller operation. The ring 36 is provided with a set of lateral projections 45, said projections alternating with depressions, and the nut or ring 20 is also provided with a set of corresponding projections 46 which also alternate with depressions, the depressions of the one ring arranged to fit and receive the projections of the other. The set of projections 45 also correspond with the ratchet teeth aforesaid, so that at each step by step rotative movement imparted to the clutch controller ring 36, in the manner just above mentioned, the said projections 45 will be moved from a position opposite the teeth 46 to a position opposite the depressions between them, or vice versa. When in the former position the clutch controller ring 36 will prevent the ring or nut 20 from moving to the right far enough to cause the operation of the high speed clutch and hence will maintain the high speed clutch in an inoperative position, but when the teeth 45 are opposite the depressions between the teeth 46, then the nut or ring 20 will be permitted to move a distance sufficient to operate the high speed clutch, as above explained.

I will now explain how the shell 26 is held stationary for the purpose of bringing about the operation of the clutch controller, as above set forth. Rearward movements imparted to the power transmitting member 11, and hence to the sleeves 14 and 15, will tend to unwind the carrier ring 23 upon the thread or grooves 34, thereby moving the said carrier to the left (as viewed in Fig. 1). In this movement the inclined faces 28 of the expanding members 25, which, it will be remembered, are supported by the said carrier, will engage the faces 31 of the shell 26, and the said shell will be moved over toward the left. At its opposite end the said carrier has inclined faces 58 which will at such times be caused to engage corresponding faces in wedge blocks 48 which are carried by, or arranged as a part of, a ring 47. (See Fig. 7). The said ring 47 is loosely mounted in the device except for its rotative connection with the shell through the said wedge blocks, and hence when the said shell is moved over to the left the ring 47 will be carried over with it. The said ring is provided with crown teeth 49 which are normally arranged to just clear similar teeth 50 upon a race ring 51, which is secured rigidly to the stationary axle 10 or other stationary part of the device. A light spring 52 normally tends to keep the rings 47 and 51 apart, said spring arranged to bear against a drag collar or washer 53, whereby the teeth 49 and 50 shall clear, but when pressure is applied in the manner just described to drive the ring 47 to the left, the teeth 49 and 50 will engage, whereby the ring 47 will be held stationary. The holding of the ring 47 stationary will, by reason of the connection thereof through the wedges 48 with the shell 26, hold the said shell stationary, and the said shell will be held stationary until forward movements are again applied to the power transmitting member 11.

In connection with the foregoing operation it will be understood that but slight rearward movements must be given to the transmitting member 11 for the purpose of only operating the clutch controller, as otherwise the effect will be to operate the brake mechanism. When it is desired to operate the brake mechanism, a rearward or back pedaling movement of sufficient amplitude and force must be applied to the transmitting member to cause the brake shell to be expanded by the action of the inclined faces 28 of the wedges 25 and the corresponding inclined faces of the wedge blocks 48, the effect of which will be to cause the outer surface of the brake shell to engage the interior face of the hub 12. The shell being held stationary at this time by means of the intermeshing of the teeth 49 and 50, the result will be a powerful braking effect upon the hub.

Fig. 6 illustrates a slight modification of the device, in which the clutch operating ring of the low speed clutch mechanism is a part independent of the operating member carrier ring 23. This clutch operating ring, which is designated in Fig. 6 by the reference character 54, may be conveniently threaded directly upon the low speed sleeve 15, there being no need for the employment in such case of the pawls 35, while the carrier ring, which is designated in this figure by the reference character 55, is arranged in close proximity thereto but normally out of engagement therewith. The adjacent faces of the rings 54 and 55 have teeth 56, arranged for co-action when the said rings are in engagement, whereby they will be rotatively connected at such times, and the ring 54 may be provided with a suitable drag ring 57, similar to the drag ring 33 employed in the high speed clutch mechanism.

What I claim is:

1. In mechanism of the class described, the combination with two-speed mechanism, a power transmitting element, a brake, and a brake operating element intermediate the brake and the power transmitting element, of means for controlling the two-speed mechanism, to bring about changes in the speed of drive, by manipulation of the brake operating element.

2. In mechanism of the class described, the combination of a driving element, a driven element, two driving sleeves geared together to rotate at different relative speeds, a brake, and an operating element for operating the brake when moved in one direction, and for connecting one or other of the said sleeves in driving relation with the driven element when moved in the other direction.

3. In mechanism of the class described, the combination of a driving element, a driven element, two driving sleeves geared together to rotate at different relative speeds, a brake, an operating element for operating the brake when moved in one direction, and for connecting one or other of the said sleeves in driving relation with the driven element when moved in the other direction, a controller for the two speed mechanism, and means for operating the controller by means of movements of the driving element.

4. In mechanism of the class described, the combination of a driving element, a driven element, two driving sleeves geared together to rotate at different speeds, clutch mechanism for connecting the said sleeves in driving relation with the said driven element, a clutch controller, a brake operating element, and means for operating the clutch controller from the brake operating element.

5. In mechanism of the class described, the combination of a driving element, a driven element, two driving sleeves geared together to rotate at different speeds, clutch operating mechanism co-acting with both said sleeves, a clutch controller for co-acting with the clutch operating mechanism of one of said sleeves, a clutch for said driven element, a brake, and an operating element arranged to be moved in different directions by the said clutch operating mechanism, and to operate the said clutch when moved in one direction and the said brake when moved in the other direction.

6. In mechanism of the class described, the combination of a driving element, a driven element, two driving sleeves geared together to rotate at different relative speeds, a clutch operating ring for each of the said sleeves, a clutch controller for the clutch operating ring on the high speed sleeve, an operating element, a clutch for the driven element arranged to be operated when the said operating element is moved in one direction, a brake, and means for applying the brake when the said operating element is moved in the other direction.

7. In mechanism of the class described, the combination with a driving element, a driven element, two-speed driving mechanism, and a brake shell for engaging the driven element, of means co-acting with the brake shell for controlling the two-speed mechanism to bring about changes in the relationship of speed of drive between the driving and driven elements.

8. In mechanism of the class described, the combination of a driving element, a driven element, two driving sleeves geared together to rotate at different relative speeds, clutch mechanism for connecting one or other of the said sleeves in driving relation with the hub, a normally rotatable brake shell, means for holding the brake shell stationary and for causing same to engage the hub for braking purposes, and means operated by the relative movements between the brake shell and the driving sleeves when the brake shell is held stationary, for controlling the said clutch mechanism.

9. The combination of a driving element, a driven element, a longitudinally movable wedge between said elements, connecting means between said driving element and said wedge for producing longitudinal movements of the latter, an expanding clutch ring between said driving element and said driven element having a wedge slot adapted to receive said wedge, and adapted, when expanded by said wedge, to engage said driven element and to make a driving connection between said driving element and said driven element, and two-speed mechanism between said driving element and said driven element, whereby the speed of drive may be varied.

10. The combination of a driving element, a driven element, a longitudinally movable wedge between said elements, connecting means between said driving element and said wedge for producing longitudinal movements of the latter, an expanding clutch ring between said driving element and said driven element having a wedge slot adapted to receive said wedge, and adapted, when expanded by said wedge to engage said driven element and to make a driving connection between said driving element and said driven element, two-speed mechanism between the driving and driven elements, and means for shifting from one speed to the other.

11. The combination of a driving element, a driven element, a longitudinally movable wedge between said elements, connecting means between said driving element and said wedge for producing longitudinal movements of the latter, an expanding clutch ring between said driving element and said driven element having a wedge slot adapted to receive said wedge, and adapted, when expanded by said wedge to engage said driven element and to make a driving connection between said driving element and said driven element, two-speed mechanism between the driving and driven elements, and means operated by movements of the driving element for shifting from one speed to the other.

12. In mechanism of the class described, the combination with two-speed mechanism, a power transmitting element, a brake, and a brake operating element intermediate the brake and the power transmitting element, of means for controlling the two-speed mechanism to bring about changes in the speed of drive by manipulation of the brake operating element, and means for manipulating the brake operating element by movements of the power transmitting element.

13. In mechanism of the class described, the combination of a driving element, a driven element, two driving sleeves geared together to rotate at different relative speeds, a brake, an operating element for operating the brake when moved in one direction, and for connecting one or other of the said sleeves in driving relation with the driven element when moved in the other direction, and means for moving the operating element by movements of the driving element.

14. In mechanism of the class described, the combination of a driving element, a driven element, two driving sleeves geared together to rotate at different relative speeds, clutch segments for engaging the driven element, a brake shell also arranged to engage the driven element, an expanding member arranged, when moved in one direction, to engage the clutch segments, and, in the other direction, to engage the brake shell, clutch operating mechanism for the two said sleeves arranged to engage the said wedge or expanding member to move same in either direction, and a clutch controller for the said clutch mechanism.

15. In mechanism of the class described, the combination of a driving element, a driven element, two driving sleeves geared together to rotate at different relative speeds, clutch segments for engaging the driven element, a brake shell also arranged to engage the driven element, an expanding member arranged, when moved in one direction, to engage the clutch segments, and, in the other direction, to engage the brake shell, clutch operating mechanism for the two said sleeves arranged to engage the said expanding member to move same in either direction, a clutch controller for the said clutch mechanism, and means coöperating with the brake shell for operating the clutch controller.

HYLA F. MAYNES.

Witnesses:
LYMAN S. ANDREWS, Jr.,
C. F. CARRINGTON.